(12) United States Patent
Jeong

(10) Patent No.: US 11,027,962 B2
(45) Date of Patent: Jun. 8, 2021

(54) BEVERAGE SUPPLY APPARATUS AND CONTROL METHOD THEREFOR

(71) Applicant: LG ELECTRONICS INC., Seoul (KR)

(72) Inventor: Gyuhyeok Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/603,333

(22) PCT Filed: Dec. 1, 2017

(86) PCT No.: PCT/KR2017/014004
§ 371 (c)(1),
(2) Date: Oct. 7, 2019

(87) PCT Pub. No.: WO2018/199421
PCT Pub. Date: Nov. 1, 2018

(65) Prior Publication Data
US 2020/0039808 A1 Feb. 6, 2020

(30) Foreign Application Priority Data

Apr. 25, 2017 (KR) .................. 10-2017-0052888

(51) Int. Cl.
*G10L 21/00* (2013.01)
*G10L 25/00* (2013.01)
(Continued)

(52) U.S. Cl.
CPC .......... *B67D 1/0882* (2013.01); *B67D 1/0881* (2013.01); *B67D 1/0888* (2013.01); *G10L 15/22* (2013.01); *G06N 3/08* (2013.01)

(58) Field of Classification Search
CPC ....... G06F 3/167; G06F 3/0482; G10L 15/22; G10L 2015/223
See application file for complete search history.

(56) References Cited

U.S. PATENT DOCUMENTS 6,711,465 B2 * 3/2004 Tomassi .................. G07F 9/026
700/236
8,572,772 B2 * 11/2013 Wolf ...................... E03C 1/057
4/623

(Continued)

FOREIGN PATENT DOCUMENTS

JP 2007-11880 A 1/2007
KR 10-2007-0037835 A 4/2007
(Continued)

*Primary Examiner* — Olujimi A Adesanya
(74) *Attorney, Agent, or Firm* — Birch, Stewart, Kolasch & Birch, LLP

(57) ABSTRACT

The present invention relates to a beverage supply apparatus comprising a sensing unit, a microphone, an artificial intelligence unit and a control unit. The control unit: activates the microphone when an object is detected; recognizes first sound data of a user when the first sound data is sensed via the activated microphone; acquires information associated with the user on the basis of the first sound data; stores the acquired information associated with the user; and determines a menu corresponding to the object on the basis of the information associated with the user and the first sound data.

15 Claims, 9 Drawing Sheets

(51) Int. Cl.
    *B67D 1/08*    (2006.01)
    *G10L 15/22*    (2006.01)
    *G06N 3/08*    (2006.01)

(56) References Cited

U.S. PATENT DOCUMENTS

| | | | | |
|---|---|---|---|---|
| 2002/0087413 | A1* | 7/2002 | Mahaffy | G10L 15/26 |
| | | | | 705/16 |
| 2006/0206379 | A1* | 9/2006 | Rosenberg | G06Q 30/02 |
| | | | | 705/14.54 |
| 2006/0293956 | A1 | 12/2006 | Walker et al. | |
| 2007/0271194 | A1* | 11/2007 | Walker | G06Q 50/188 |
| | | | | 705/80 |
| 2011/0144801 | A1* | 6/2011 | Selker | G07F 9/023 |
| | | | | 700/231 |
| 2012/0156337 | A1* | 6/2012 | Studor | A23F 5/26 |
| | | | | 426/231 |
| 2014/0122090 | A1* | 5/2014 | Park | G06F 3/167 |
| | | | | 704/275 |
| 2015/0245734 | A1* | 9/2015 | Vogelsang | A47J 31/4403 |
| | | | | 99/289 R |
| 2016/0166096 | A1* | 6/2016 | DiMaria-Ghalili | G01N 21/51 |
| | | | | 702/19 |
| 2016/0255991 | A1* | 9/2016 | Givens, Jr. | B01F 3/04808 |
| 2018/0070760 | A1* | 3/2018 | Herbert | A23G 9/22 |
| 2020/0024120 | A1* | 1/2020 | Park | B67D 1/0888 |

FOREIGN PATENT DOCUMENTS

| | | |
|---|---|---|
| KR | 10-2009-0087026 A | 8/2009 |
| KR | 10-1123891 B1 | 3/2012 |

\* cited by examiner

BEVERAGE SUPPLY APPARATUS AND CONTROL METHOD THEREFOR

CROSS REFERENCE TO RELATED APPLICATIONS

This application is the National Phase of PCT International Application No. PCT/KR2017/014004, filed on Dec. 1, 2017, which claims priority under 35 U.S.C. 119(a) to Patent Application No. 10-2017-0052888, filed in the Republic of Korea on Apr. 25, 2017, all of which are hereby expressly incorporated by reference into the present application.

TECHNICAL FIELD

The present invention relates to an apparatus for supplying beverage based on a voice signal and controlling method thereof.

BACKGROUND ART

Recently, the technological field of artificial intelligence, which enables thinking similar to human intelligence, has developed rapidly based on machine learning techniques. Such artificial intelligence can allow machines to replace human behavior in manipulating machines through conventional human thought. Thus, there are various movements to utilize artificial intelligence in various industrial fields.

In particular, many electronic devices are used in the typical home, and a variety of ways are also proposed to utilize artificial intelligence in these electronic devices. Therefore, in the present invention, for beverage suppliers that can repeatedly receive inputs of similar commands from users, such as water purifiers and coffee machines, a method for a user to be supplied with beverage mode conveniently by loading artificial intelligence services is proposed.

DISCLOSURE OF THE INVENTION

Technical Tasks

One technical task of one embodiment of the present invention is to provide a method of being supplied with beverage using artificial intelligence.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In one technical aspect of the present invention, provided herein is an apparatus for supplying beverage, the apparatus including a sensing unit, a microphone, an artificial intelligence unit, and a controller configured to activate the microphone if detecting an object, recognize a first sound data of a user if sensing the first sound data through the activated microphone, obtain information of the user based on the first sound data, store the obtained information of the user, and determine a menu corresponding to the object based on the user's information and the first sound data.

The artificial intelligence unit may save the user's information and the information on the determined menu by learning the sensed first sound data.

If both a linguistic expression and a non-linguistic expression are included in the first sound data, the artificial intelligence unit may save the user's information and the information on the menu by considering both of the linguistic expression and the non-linguistic expression.

The controller may convert the first sound data into a text and determine the menu corresponding to the object based on the text.

The apparatus may further include an audio output unit. If the menu corresponding to the object is determined, the controller may output the information on the menu as an audio signal through the audio output unit.

The apparatus may further include a display unit. If the menu corresponding to the object is determined, the controller may output the information on the menu as a visual signal through the display unit.

If a second sound data of the user is sensed through the activated microphone, the controller may change the menu corresponding to the object based on the second sound data.

If the second sound data is sensed, the artificial intelligence unit may save the user's information and information on the determined menu by learning the first sound data and the second sound data.

The apparatus may further include a water supply unit, and the water supply unit may supply the determined menu to the object under control of the controller.

The controller may determine at least one of a type, amount and temperature of the supplied menu based on the user's information and the first sound data.

The apparatus may further include a memory, and one of the controller and the artificial intelligence unit may save information on at least one of the first sound data, the user's information and the menu to the memory.

The apparatus may further include a weight detecting unit. And, the controller may measure a weight of the object through the weight detecting unit and determine an amount of the menu based on the measured weight of the object.

The apparatus may further include a camera, and the controller may obtain the user's information through the camera.

The apparatus may further include a wireless communication unit performing communication with an external server or an external device. If sensing the first sound data, the controller may obtain information of the user corresponding to the first sound data through the external server or the external device.

The controller may analyze a difficulty level of the first sound data. If the analyzed difficulty level is a first difficulty level, the controller may determine the menu based on information stored in the apparatus for supplying the beverage. If the analyzed difficulty level is a second difficulty level, the controller may determine the menu through the external server or the external device.

The controller may determine the menu corresponding to the object by considering time information.

And, the user's information may include age information and sex information.

In another technical aspect of the present invention, provided herein is a method of controlling a beverage supply apparatus, the method including detecting an object, activating a microphone, sensing a first sound data of a user, recognizing the first sound data, obtaining information of the user based on the first sound data, storing the obtained information of the user, and determining a menu corresponding to the object based on the user's information and the first sound data.

Technical solutions obtainable from the present invention are non-limited by the above-mentioned technical solutions. And, other unmentioned solutions can be clearly understood from the following description by those having ordinary skill in the technical field to which the present invention pertains.

Advantageous Effects

The present invention has an effect of providing a beverage supply apparatus that can enhance user convenience.

Particularly, the present invention has an effect that beverage desired by a user can be supplied in a manner of recognizing a user's voice signal. More particularly, a beverage supply apparatus of the present invention has an effect of supplying a user-desired beverage can be supplied in a manner of collecting a user's repetitive voice signal despite that a user fails to give a command with a perfect sentence.

Effects obtainable from the present invention are non-limited by the above-mentioned effects. And, other unmentioned effects can be clearly understood from the following description by those having ordinary skill in the technical field to which the present invention pertains.

BEST MODE FOR INVENTION

Figure 1:
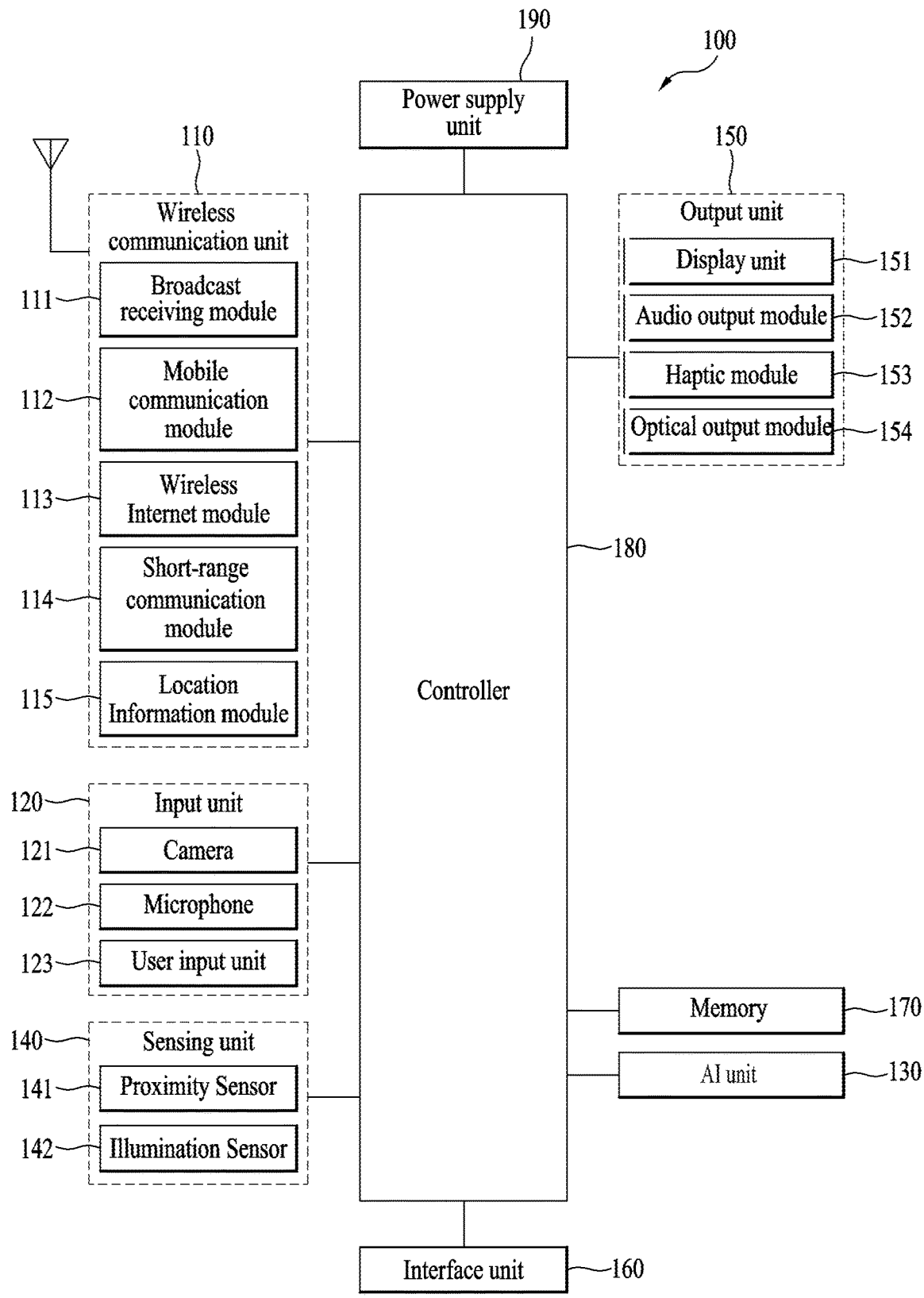
FIG. 1 is a block diagram of a beverage supply apparatus related to one embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Beverage supply apparatuses presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra-books, wearable devices (for example, smart watches, smart glasses, head mounted displays (HMDs)), and the like.

By way of non-limiting example only, further description will be made with reference to particular types of beverage supply apparatuses. However, such teachings apply equally to other types of terminals, such as those types noted above. In addition, these teachings may also be applied to stationary terminals such as digital TV, desktop computers, and the like.

Reference is now made to FIG. 1, where FIG. 1 is a block diagram of a beverage supply apparatus in accordance with the present disclosure.

The beverage supply apparatus 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Hereinafter, the components will be described in order.

The wireless communication unit 110 typically includes one or more components which permit wireless communication between the beverage supply apparatus 100 and a wireless communication system or network within which the mobile terminal is located. For instance, the wireless communication unit 110 includes one or more of a broadcast receiving module 111, a mobile communication module 112, a wireless Internet module 113, a short-range communication module 114, and a location information module 115.

The broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

Examples of broadcast associated information may include information associated with a broadcast channel, a broadcast program, or a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like.

The broadcast receiving module 111 may receive a diagram broadcast signal using a digital broadcast system such as DMB-T (Digital Multimedia Broadcasting-Terrestrial), DMB-S (Digital Multimedia Broadcasting-Satellite), MediaFLO (Media Forward Link Only), DVB-H (Digital Video Broadcast-Handheld), DVB-CBMS (Convergence of Broadcasting and Mobile Service), OMA-BCAST (Open Mobile Alliance-BroadCAST), CMMB (China Multimedia Mobile Broadcasting), MBBMS (Mobile Broadcasting Business Management System), ISDB-T (Integrated Services Digital Broadcast-Terrestrial), etc. Of course, the broadcast receiving module 111 may be configured to be suitable for other broadcast systems as well as for the above-mentioned digital broadcast systems.

A broadcast signal and/or broadcast associated information, which is received via the broadcast receiving module 111, may be saved to the memory 170.

The mobile communication module 112 transceives wireless signals with at least one of a base station, an external terminal and a server on a mobile communication network such as GSM, CDMA, and WCDMA (non-limited by this). The wireless signals may include data of various types according to transmissions/receptions of voice call signals, video call signals, or text/multimedia messages.

The wireless internet module 113 means a module for wireless internet access and may be built in or out of the beverage supply apparatus 100. Wireless internet technologies may employ WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE, etc. (non-limited by this).

In some embodiments, when the wireless Internet access is implemented according to, for example, WiBro, HSDPA, HSDPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA). Ultra-WideBand (UWB) and ZigBee, and the like.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, and the like) for allowing a user to input information. Data (for example, audio, image, and the like) is obtained by the input unit 120 and may be analyzed and processed by controller 180 according to user commands thereof.

The camera 121 may process image frames of still pictures or video obtained by image sensors in a video or image capture mode. The processed image frames can be displayed on the display unit 151.

The image frames processed by the camera 121 may be saved to the memory 170 or transmitted externally via the wireless communication unit 110. Two or more cameras 121 may be provided depending on use environments.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 may generate input data for controlling an operation of the beverage supply apparatus. The user input unit 123 may include a keypad, a dome switch, a touch pad, a jog wheel, a jog switch, and the like.

An Artificial Intelligence (AI) unit 130 plays a role in processing informations based on the artificial intelligence technology and may include one of more modules that perform at least one of information learning, information reasoning, information perception, and natural language processing.

Using the machine learning technology, the AI unit 130 can perform at least one of learning, reasoning and processing of massive amount of information (e.g., big data) including information stored in the beverage supply apparatus, surrounding environment information of the beverage supply apparatus, information stored in a communicational external storage and the like. And, using the informations learned using the machine learning technology, the AI unit 130 may predict (or reason on) at least one executable operation of the beverage supply apparatus and control the beverage supply apparatus to execute an operation having the highest practicality among the at least one or more of the predicted operations.

The machine learning technology is a technology that collects to learn large-scale information based on at least one algorithm and judges to predict information based on the learned information. Learning information is the act of identifying the characteristics, rules, and judgment criteria of information, quantifying the relationship between information and information, and predicting new data using quantified patterns.

The algorithms used by these machine learning technologies can be statistical-based algorithms and, for example, may include decision trees that use tree-structure forms as predictive models, artificial neural networks that mimic the structure and function of the organism's neural network, gene programming based on the evolutionary algorithm of living creatures, clustering of distributing observed examples into sub-sets called clusters, Monte Carlo method of calculating a function value into probability through randomly-extracted random numbers, etc.

As one field of the machine learning technology, deep learning technology is a technology that uses artificial neural network algorithms to perform at least one of the learning, judgment and processing of information. Artificial neural networks can have structures that connect between layers and layers, and transmit data between layers and layers. These deep learning techniques can learn a massive amount of information through artificial neural networks using GPU (graphical processing unit) optimized for parallel computation.

Meanwhile, in order to collect a massive amount of informations to apply the machine learning technology, the AI unit 130 may collect (e.g., detect, monitor, extract, detect, receive, etc.) signals, data, information and the like that are inputted to or outputted from the components of the beverage supply apparatus. And, the AI unit 130 may collect (e.g., detect, monitor, extract, detect, receive, etc.) data, information and the like that are stored in an external storage (e.g., cloud server). Particularly, the collection of information may be understood as a term that includes an operation of detecting information via sensors, extracting information stored in the memory 170, or receiving informations from an external storage by communication.

The AI unit 130 may detect information in the beverage supply apparatus, surrounding environment information around the beverage supply apparatus and user information through the sensing unit 140. And, the AI unit 130 may receive broadcast signals and/or broadcast associated information, wireless signals, wireless data and the like through the wireless communication unit 110. Moreover, the AI unit 130 may receive inputs of video information (or signals), audio information (or signals), data and user input information from the input unit.

The AI unit 130 may collect massive amounts of informations by real rime on a background, learn the collected informations, and save appropriately processed informations (e.g., knowledge graphs, command policy, personalized database, conversation engine, etc.) to the memory 170.

If an operation of the beverage supply apparatus is predicted based on the informations learned using the machine learning technology, the AI unit 130 may control the components of the beverage supply apparatus or deliver a control command for performing the predicted operation to the controller 180 in order to perform the predicted operation. Based on the control command, the controller 180 may perform the predicted operation by controlling the beverage supply apparatus.

Meanwhile, once a specific operation is performed, the AI unit 130 may analyze history information indicating the performance of the specific operation and then perform an update of the previously learned information based on such analysis information. Hence, the AI unit 130 may enhance the accuracy of the information prediction.

In some implementations, the AI unit 130 and the controller 180 may be understood as the same component in the present specification. In this case, a function performed by the controller 180 described in the present specification may be represented as performed by the AI unit 130. And, the controller 180 may be named the AI unit 130, and vice versa.

On the other hand, in the present specification, the AI unit 130 and the controller 180 may be understood as separate components, respectively. In this case, the AI unit 130 and the controller 180 may perform various controls on the beverage supply apparatus through mutual data exchanges. Based on the result deduced from the AI unit 130, the controller 180 may perform at least one function on the beverage supply apparatus or control at least one of the components of the beverage supply apparatus. Furthermore, the AI unit 130 may be operated under the control of the controller 180.

The sensing unit 140 generates a sensing signal for controlling an operation of the beverage supply apparatus 100 by detecting such current states of the beverage supply apparatus 100 as an open/closed state of the beverage supply apparatus 100, a presence or non-presence of user contact, the bearing of the beverage supply apparatus, acceleration/deceleration of the beverage supply apparatus, etc. For example, if the beverage supply apparatus 100 is a slide phone type, it is able to sense whether a slide phone is open or closed. Moreover, it may be able to sense a presence of non-presence of a power supply of the power supply unit 190, a presence or non-presence of an external device coupling to the interface unit 170, etc. Meanwhile, the sensing unit 140 may include the proximity sensor 141.

The output unit 150 is typically configured to output various types of information, such as audio, video, tactile output, and the like. The output unit 150 is shown having a display unit 151, an audio output module 152, a haptic module 153, and an optical output module 154.

The output unit 150 may output a signal for indicating an event occurrence of the beverage supply apparatus 100. Examples of events occurring in the beverage supply apparatus may include a call signal reception, a message reception, a key signal input, a touch input and the like. The output unit 150 may output a different type signal, e.g., a signal for indicating an event occurrence with vibration as well as a video or audio signal. The video or audio signal may be outputted through the display unit 151 or the audio output module 152. In this case, the display unit 151 or the audio output module 152 may be classified into a sort of the output unit 150.

The display unit 151 displays (outputs) information processed by the beverage supply apparatus 100. For example, if the beverage supply apparatus in call mode, the display unit 151 displays a User Interface (UI) or a Graphic User Interface (GUI) associated with a call. If the beverage supply apparatus is in video call mode or camera mode, the display unit 151 displays a shot image or/and a received image or UI/GUI.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, and combinations thereof.

Some of the above display devices may be configured as a transparent type or a light-transmissive type so as to allow an outside to be seen therethrough. This may be called a transparent display. As a representative example of the transparent display includes Transparent OLED (TOLED), etc. A rear structure of the display unit 151 may be configured as a light-transmissive type structure. Owing to such a structure, a user may view a thing located in rear of the terminal body through an area occupied by the display unit 151 in the terminal body.

Depending on the implementation type, two or more display units 151 may exist. For example, a plurality of display units may be disposed on a single face in a manner of being spaced apart from each other or integrated in one body, or displayed on different faces, respectively.

If the display unit 151 and a sensor (hereinafter 'touch sensor') configured to sense a touch act form a mutually-layered structure (hereinafter named 'touchscreen'), the display unit 151 may be usable as an input device as well as an output device. The touch sensor may be in form of a touch film, a touch sheet, a touchpad, etc.

The touch sensor may be configured to convert a change of a pressure applied to a specific spot of the display unit 151 or a change of electrostatic capacity generated from a specific spot of the display unit 151 into an electrical input signal. The touch sensor may be configured to sense a pressure of a touch as well as a touched location and area.

If there is a touch input to the touch sensor, signal(s) corresponding to the touch input is sent to a touch controller (not shown). The touch controller processes the signal(s) and then sends corresponding data to the controller 180. Thus, the controller 180 can be aware whether a prescribed region of the display unit 151 is touched.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to, denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen.

The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the beverage supply apparatus 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the beverage supply apparatus 100.

An optical output module 154 can output a signal for indicating an event generation using light of a light source. Examples of events generated in the beverage supply apparatus 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface with various types of external devices that can be coupled to the beverage supply apparatus 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the beverage supply apparatus 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the beverage supply apparatus 100 via the interface unit 160.

When the beverage supply apparatus 100 is connected with an external cradle, the interface unit 160 can serve as a passage to allow power from the cradle to be supplied to the beverage supply apparatus 100 or may serve as a passage to allow various command signals input by the user from the cradle to be transferred to the beverage supply apparatus there through. Various command signals or power input from the cradle may operate as signals for recognizing that the beverage supply apparatus is properly mounted on the cradle.

The memory 170 can store programs to support operations of the controller 180 and store input/output data (for example, phonebook, messages, still images, videos, etc.).

The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The interface unit 160 serves as an interface with various types of external devices that can be coupled to the beverage supply apparatus 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The identification module may be a chip that stores various information for authenticating authority of using the beverage supply apparatus 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the beverage supply apparatus 100 via the interface unit 160.

When the beverage supply apparatus 100 is connected with an external cradle, the interface unit 160 can serve as a passage to allow power from the cradle to be supplied to the beverage supply apparatus 100 or may serve as a passage to allow various command signals input by the user from the cradle to be transferred to the beverage supply apparatus there through. Various command signals or power input from the cradle may operate as signals for recognizing that the beverage supply apparatus is properly mounted on the cradle.

The controller 180 typically controls overall operations of the beverage supply apparatus. For example, the controller 180 performs controls and processings associated with voice call, data communication, video call and the like. The controller 180 may be equipped with a multimedia module 181 for multimedia playback. The multimedia module 181 may be implemented within or separately from the controller 180.

The controller 180 may perform pattern recognition processing for recognizing a handwriting/drawing input onto the touchscreen as text/image.

The power supply unit 190 receives an external or internal power and supplies the power required for operations of the components under the control of the controller 180. The power supply unit 190 includes a battery. And, the battery may include a built-in battery or a replaceable battery.

Various embodiments of the present invention may be implemented in a recording medium readable by a computer or a similar device using hardware, firmware, software, or a combination thereof for example.

In a hardware configuration, the embodiments described herein may be achieved by one or more ASICs, DSPs, DSPDs, PLDs, FPGAs, processors, controllers, microcontrollers, microprocessors, and electrical units for other function performance. In some cases, embodiments described in the present specification may be implemented as the controller 180 itself.

In a software configuration, embodiments such as procedures and functions described in the present specification may be implemented in the form of separate software modules. Each of the software modules may perform one or more functions and operations described in the present specification. Software code may be implemented with a software application written in a suitable program language. The software code may be stored in the memory 170 and executed by the controller 180.

Moreover, although not shown in FIG. 1, the controller 180 according to the present invention may include a Text-To-Speech (TTS) module, a natural language processing module and a feedback estimation module.

The TTS module is configured to convert a natural language displayed on the display unit 151 into audio and forward it to the audio output unit 152. Particularly, the TTS module is configured to convert a natural language into sound in direct and forward it to the audio output unit 152. The TTS module according to the present invention may create a synthetic sound by automatically analyzing a natural language in unit of a sentence and then forward the created synthetic sound to the audio output unit 152. In case that a natural language is displayed on the display unit 151, it may be displayed in form of a string-combined text.

The natural language processing module is configured to mechanically analyze a human-spoken language phenomenon and convert it into a computer-understandable form. The natural language processing module may perform morphology analysis, phrase unit analysis and syntax analysis to analyze human language and output the meaning of the natural language in machine language. The natural language processing module according to the present invention may analyze the meaning of the natural language in the sentence unit and output it In the natural language processing module, morphology analysis may mean outputting all possible analysis results of any target phrase. Specifically, the natural language processing module may use table parsing to select the appropriate number of cases in which the word can break apart. A sentence unit analysis may mean performing an analysis of noun phrase, verb phrase, adverb phrase, etc., and a clause unit analysis may mean breaking down sentences such as middle sentence and compound sentence into single sentence units. Syntax analysis may mean breaking down a sentence into the constituent components that make the sentence and analyzing hierarchical relationships between them to determine the structure of the sentence.

The feedback estimation module is intended to determine the feedback that corresponds to the meaning of the natural language outputted from the natural language processing module. The feedback estimation module may include at least one of a background sound estimation module, a vibration determination module, a display determination module, and a light source determination module. The background sound estimation module is designed to determine sound data that conforms to the meaning of natural language, and the vibration determination module is designed to determine whether or not vibration is outputted according to the meaning of natural language. Likewise, the display determination module is configured to determine whether the output of the display unit 151 varies according to the meaning of the natural language, and the light source determination module may be configured to determine whether or not to flash the light source according to the meaning of the natural language.

Embodiments related to a control method that can be implemented in the above-configured beverage supply apparatus are described as follows. In describing and understanding the embodiments of the present invention, the contents described with reference to FIG. 1 may be referred to. And, it will be obvious to those skilled in the art that the present invention can be embodied into other specific forms without departing from the spirit and scope of the invention.

Based on the above-described contents, the beverage supply apparatus 100 according to the present invention shall be described in detail.

Figure 2:
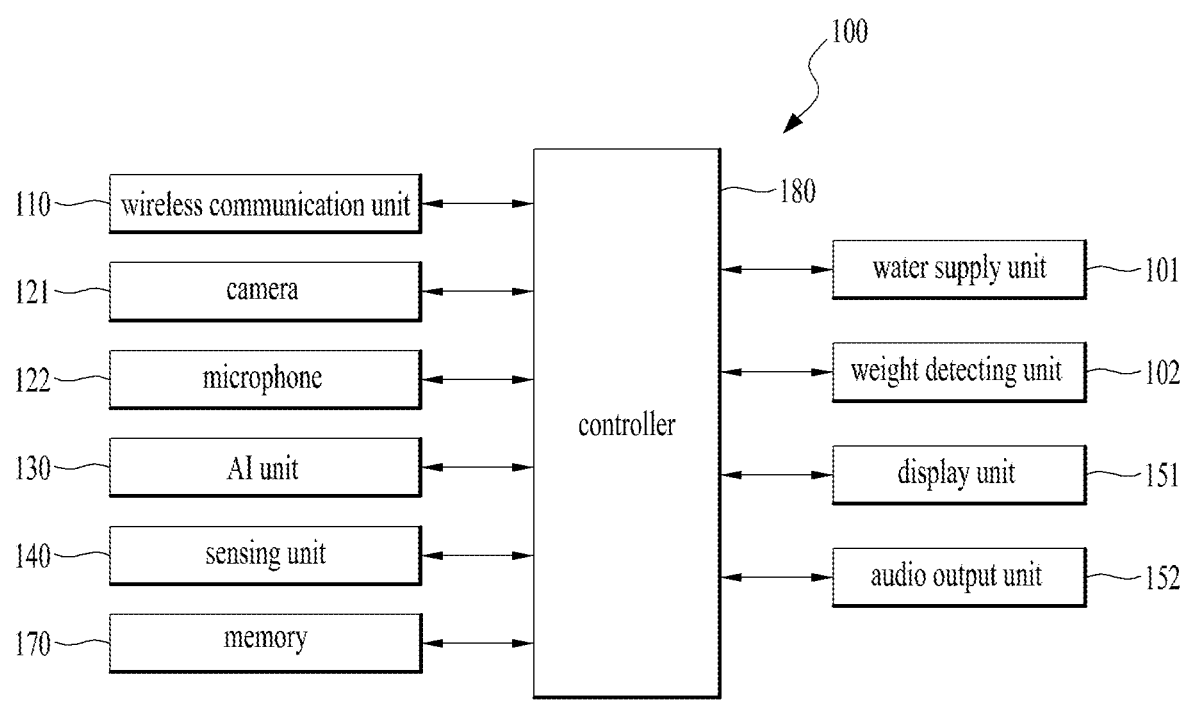
FIG. 2 is a block diagram of a beverage supply apparatus according to one embodiment of the present invention.

FIG. 2 is a block diagram of a beverage supply apparatus according to one embodiment of the present invention.

Referring to FIG. 2, a beverage supply apparatus 100 may include at least one of a water supply unit 101, a weight detecting unit 102, a wireless communication unit 110, a camera 121, a microphone 122, an Artificial Intelligence (AI) unit 130, a sensing unit 140, a display unit 151, an audio output unit 152, a memory 170 and a controller 180. Here, the configurations shown in FIG. 2 may be implemented with the former configuration described with reference to FIG. 1. And, the beverage supply apparatus 100 may further include various configurations in addition to the above-described configuration. Yet, the following description shall be made by focusing on the configuration associated with the embodiment of the present invention.

The water supply unit 101 is provided to the beverage supply apparatus 100 and may perform a function of externally supplying beverage from the beverage supply apparatus 100. In doing so, the water supply unit 101 may supply beverage to an object detected under the control of the controller. For example, if the object detected by the beverage supply apparatus 100 is a water glass having a volume of 300 ml, the beverage supply apparatus 100 can supply purified water through the water supply unit 101. And, the water supply unit 101 may be configured with the conventional structure of the water supply unit 101 of the beverage supply apparatus 100.

The weight detecting unit 102 is provided to the beverage supply apparatus 100, thereby detecting an object and a weight of the object. In one embodiment of the present invention, the beverage supply apparatus 100 may measure a weight of an object through the weight detecting unit 102 and determine an amount of the supplied beverage based on the measured weight of the object. For example, if a user puts a water glass of 300 g on the beverage supply apparatus 100, the beverage supply apparatus 100 can detect the weight of the water glass as 300 g through the weight detecting unit 102. And, the weight detecting unit 102 may be configured with the conventional structure of the weight detecting unit 102 of the beverage supply apparatus 100.

The wireless communication unit 110 may perform communication and transmit/receive data signals using various protocols among the beverage supply apparatus 100, other external electronic devices and servers. In one embodiment of the present invention, in case of sensing sound data, the beverage supply apparatus 100 can obtain information corresponding to the sound data from an external server or device through the wireless communication unit 110.

The camera 121 is provided to the beverage supply apparatus 100 and may capture a user who is using the beverage supply apparatus 100. In one embodiment of the present invention, the beverage supply apparatus 100 may obtain user's information through the camera 121. Particularly, the camera 121 may capture a user's face and whole body and then send an obtained image to the controller 180. Thereafter, the controller 180 extracts a feature point and pattern from the obtained image, thereby enabling human determination, sex estimation and age estimation.

The microphone 122 is provided to the beverage supply apparatus 100 and may detect an audio signal. In one embodiment of the present invention, the microphone 122 can be activate4d under the control of the controller 180. For example, if an audio signal is not detected over a preset time, the microphone 122 can maintain a deactivated state. In case that the beverage supply apparatus 100 detects an object, the microphone 122 can be activated. And, the microphone 122 may forward the detected audio signal to the controller 180.

The AI unit 130 may learn sound data and then save user's information and information on a determined menu. Particularly, the beverage supply apparatus 100 may determine user's information and a menu corresponding to an object through the obtained audio signal and image. In doing so, the AI unit 130 maps, saves and learns the obtained audio signal, image, user information and menu, thereby determining and predicting subsequent information based on the above-accumulated information.

The AI unit 130 may learn user's information such as condition, age, sex and the like using the information received from the controller 180 and then save the learned information to the memory 170. Particularly, as described above, the controller 180 may obtain user's information through the camera 121 or the microphone 122 and transmit the obtained information to the AI unit 130. In doing so, the AI unit 130 may save the information in a manner of classifying the information into user's predetermined non-linguistic or linguistic expression. Here, the non-linguistic expression may include a gesture act such as hand gesture, foot gesture and the like or a sound signal such as yawning sound, gasping sound and the like for example. And, the linguistic expression may correspond to a command coming from user's mouth or an expression recognized as a language by the AI unit 130. The AI unit 130 may determine user's condition, age, sex, etc. by considering all the non-linguistic and linguistic expressions that are saved by being classified.

The sensing unit 140 senses user's various inputs to the beverage supply apparatus 100 and the environment of the beverage supply apparatus 100, thereby delivering a sensing result to enable to controller 180 to perform a corresponding operation. In one embodiment of the present invention, the sensing unit 140 may detect a user's touch input signal of touching the display unit 151 of the beverage supply apparatus 100 or a gesture input signal detected through the sensing unit 140. Moreover, the sensing unit 140 further includes an illumination sensor, a temperature sensor, a humidity sensor and the like, thereby detecting an environment around the beverage supply apparatus 100 in detail.

The display unit 151 may display visual information. Here, the visual information may include a text, an indicator, an icon, a content, an application, an image, a video, etc. And, the display unit 151 may output visual information to a screen based on a control command of the controller 180. Moreover, the display unit 151 may be disposed toward user's eyes. In one embodiment of the present invention, the display unit 151 may output information on a menu, which is determined through sound data by the beverage supply apparatus 100, as a visual signal.

The audio output unit 152 may output information, which is determined through sound data by the beverage supply apparatus 100, as sound.

The memory 170 may store information on at least one of sound data sensed by the beverage supply apparatus 100, user information obtained from the sound data and a menu determined based on them. And, the memory 170 may be provided inside or outside the beverage supply apparatus 100 and store, modify or delete the information under the control of the AI unit 130 or the controller 180. Moreover, the memory 170 may save information on user's condition, age and sex, which is learned through the AI unit 130 as described above, in a manner of classifying such information. Furthermore, the memory 170 may store information on a previously collected age and sex as well as information on a newly acquired age and sex.

The controller 180 may process data, control the aforementioned respective components of the beverage supply apparatus 100, and control data transmission/reception between the components.

As one embodiment of the present invention, operations performed by the beverage supply apparatus 100 can be controlled by the controller 180. Yet, in the drawings and the following description, for convenience, it is commonly described that such operations are performed/controlled by the beverage supply apparatus 100.

Various detailed embodiments are described in the following. And, the respective steps in FIGS. 3 to 5 described in the following may be controlled by the controller.

Figure 3:
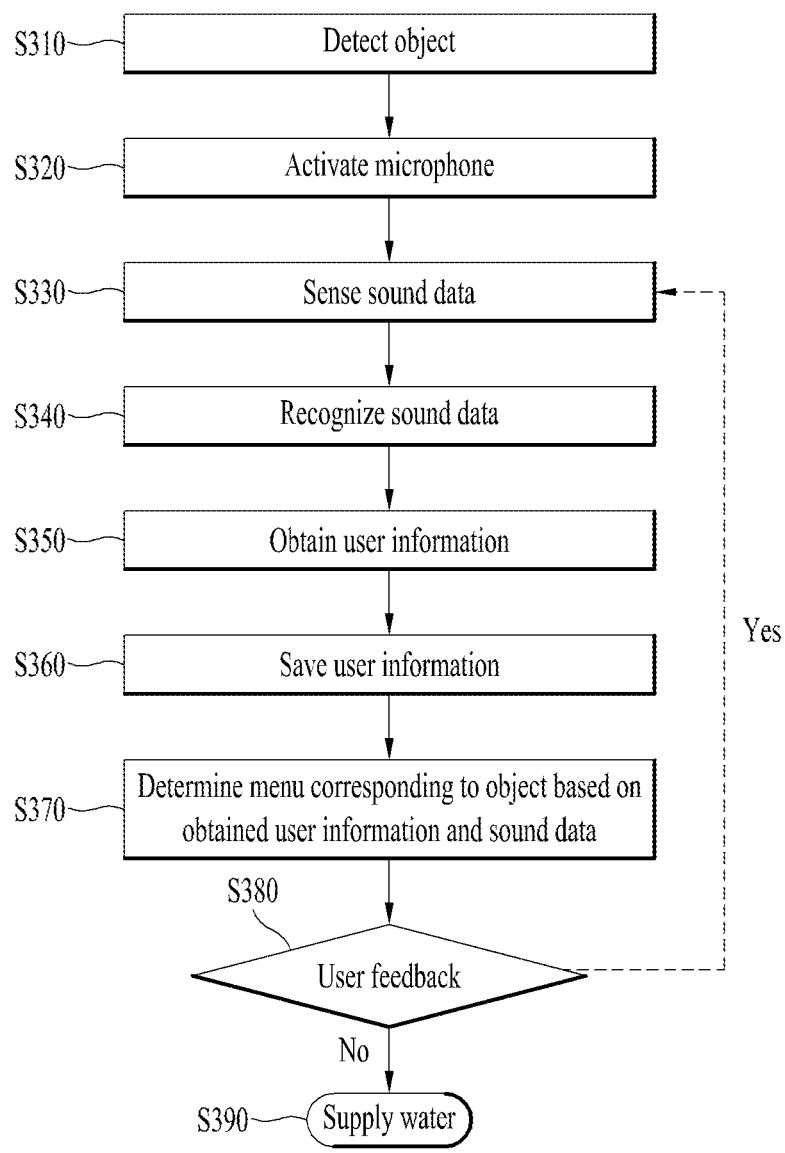
FIG. 3 is a flowchart of an operation of a beverage supply apparatus according to one embodiment of the present invention.

FIG. 3 is a flowchart of an operation of a beverage supply apparatus according to one embodiment of the present invention. The description redundant with FIG. 2 shall be omitted from the following description of the embodiment shown in FIG. 3.

Referring to FIG. 3, in a step S310, the beverage supply apparatus may detect an object. Particularly, the beverage supply apparatus may detect an object within a preset range from the beverage supply apparatus through the weight detecting unit or the sensing unit provided to the beverage supply apparatus. For example, the beverage supply apparatus can detect a user's hand holding a cup or a cup put on the weight detecting unit of the beverage supply apparatus. In this case, the beverage supply apparatus can detect the weight of the cup put on the weight detecting unit.

In a step S320, the beverage supply apparatus may activate the microphone. If an object is detected, the beverage supply apparatus can activate the microphone. Namely, if the microphone is always activated, the beverage supply apparatus should receive unnecessary audio signals all the time, whereby unnecessary power may be wasted. Hence, only if an object is detected, the beverage supply apparatus can activate the microphone. After the microphone has been activated according to the detection of the object, if the microphone does not detect an audio signal for a preset time, the beverage supply apparatus can deactivate the microphone.

In a step S330, the beverage supply apparatus may sense sound data. Particularly, the beverage supply apparatus can sense sound data through the microphone. Here, the sound data may correspond to all signals outputted as sound. For example, the sound data may include a natural language such as wind sound, which is not generated from human, as well as linguistic and non-linguistic expressions of human. In this case, the beverage supply apparatus can sense an audio signal generated from human as sound data.

In a step S340, the beverage supply apparatus may recognize the sensed sound data. Particularly, the beverage supply apparatus can recognize the sensed sound data using the TTS module, the natural language processing module, the feedback estimation module and the like included in the controller. Namely, the beverage supply apparatus may convert the sensed sound data into a text using the TTS module included in the controller and then analyze it. Moreover, the beverage supply apparatus may recognize the sensed sound data itself without changing the sensed sound data into the text. Namely, since the beverage supply apparatus includes numerous data, it is able to perform a function according to sound data owing to the repetitive learning without changing the sensed data into the text.

In a step S350, the beverage supply apparatus may obtain user information based on the recognized sound data. Particularly, the beverage supply apparatus may obtain user's condition, age and sex from the sound data. As there are many conventional technologies of recognizing an age and sex of a speaker from a voice signal, the beverage supply apparatus may use them. Moreover, the beverage supply apparatus may obtain user's information from an external server or device based on sound data, which will be described later.

In a step S360, the beverage supply apparatus may save the obtained user information. The beverage supply apparatus may save the sound data and newly obtained user information to the memory. Hence, as the user information corresponding to the sound data is accumulated, the beverage supply apparatus can predict user's information corresponding to the sound data more accurately. This shall be described in detail with reference to the following drawing.

In a step S370, the beverage supply apparatus may determine a menu corresponding to the object based on the obtained user information and sound data. Particularly, the beverage supply apparatus may obtain various kinds of information from the sound data. For example, the beverage supply apparatus may infer user's age and sex from the sound data and also obtain information on menu selection and information on an amount through the contents included in the sound data. This shall be described in detail with reference to FIG. 4.

In a step S380, the beverage supply apparatus may receive user feedback. In case of determining a menu corresponding to the object based on the obtained user information and sound data, the beverage supply apparatus may output information corresponding to the determined menu through the audio output unit, the display unit and the like. Hence, after the information corresponding to the determined menu has been outputted, the beverage supply apparatus may detect user's feedback for a preset time. Namely, after the information corresponding to the determined menu has been outputted, the beverage supply apparatus may receive user's feedback on the determined menu. An embodiment related to the user's feedback shall be described in detail with reference to FIG. 5.

If the beverage supply apparatus fails to receive the user feedback on the determined menu within a preset time or receives positive feedback on the determined menu, a step S390 may be performed.

In the step S390, the beverage supply apparatus may supply the determined menu to the detected object. Particularly, the beverage supply apparatus may externally supply the beverage stored inside or outside under the control of the controller.

Figure 4:
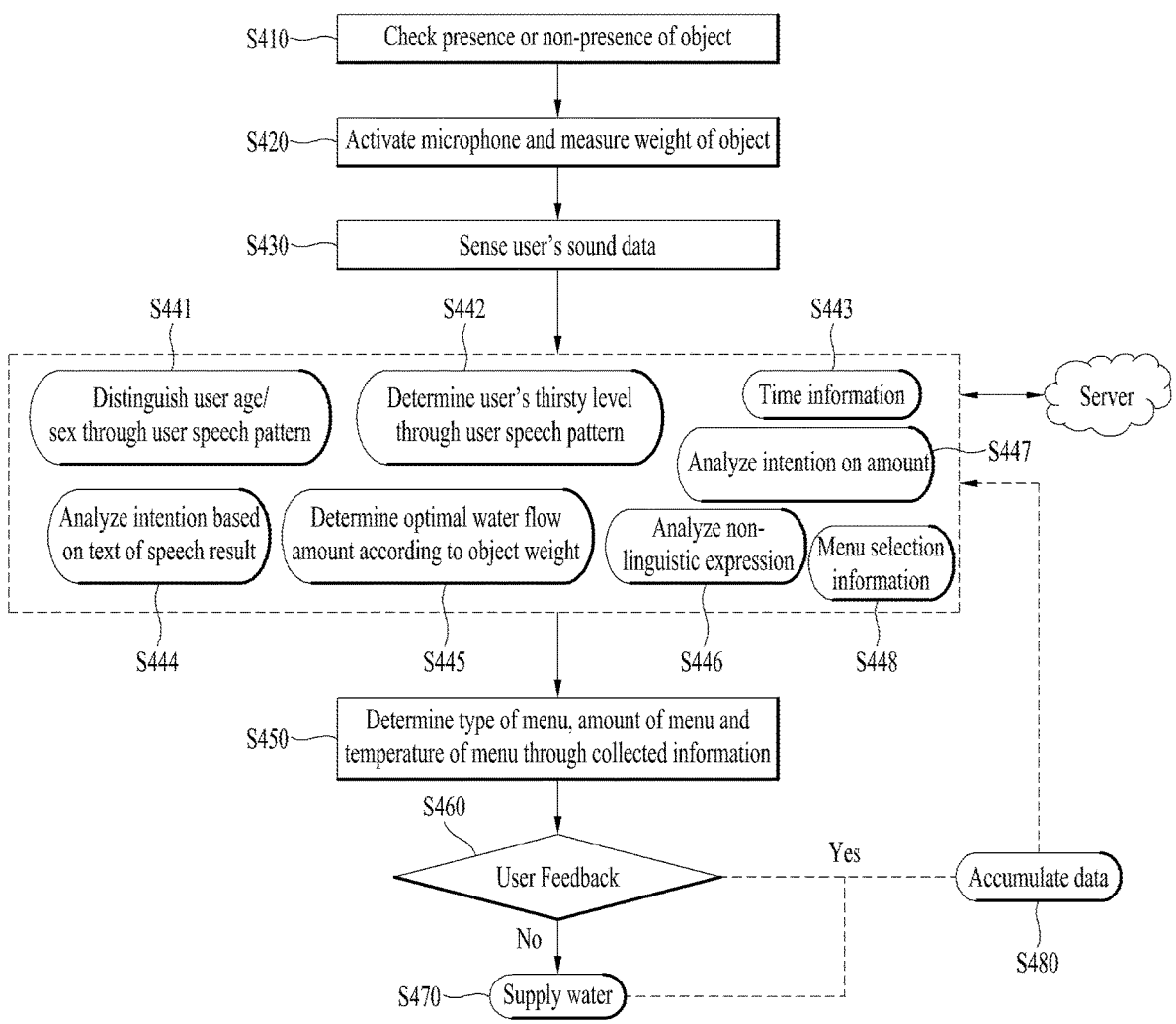
FIG. 4 is a flowchart of an operation of a beverage supply apparatus according to one embodiment of the present invention in case of non-presence of user's feedback.

FIG. 4 is a flowchart of an operation of a beverage supply apparatus according to one embodiment of the present invention in case of non-presence of user's feedback. The description redundant with FIG. 3 shall be omitted from the following description of the embodiment shown in FIG. 4.

Referring to FIG. 4, in a step S410, the beverage supply apparatus may check a presence or non-presence of an object. As described above, the beverage supply apparatus can detect a presence or non-presence of an object through the weight detecting unit or the sensing unit provided to the beverage supply apparatus. The following description shall be made on the assumption of a case that the object is a cup. Namely, the beverage supply apparatus can detect that the cup is put on the weight detecting unit.

In a step S420, the beverage supply apparatus may activate the microphone and detect the weight of the object. Particularly, as the cup is put on the weight detecting unit, the beverage supply apparatus can prepare for the reception of sound data by activating the microphone and then measure the weight of the cup through the weight detecting unit.

In a step S430, the beverage supply apparatus may sense user's sound data through the activated microphone. If the sound data is sensed through the step S430, the beverage supply apparatus may recognize and obtain various kinds of information included in the sound data.

For example, in a step S441, the beverage supply apparatus may identify user's age and sex through a user's speech pattern. For example, when a user over 65 years old speaks, the beverage supply apparatus can refer to slow speech through the existing database.

Moreover, in a step S442, the beverage supply apparatus may determine user's thirsty level through user's speech pattern. For example, when a user speaks the same content hurriedly, the beverage supply apparatus can determine that the user is more thirsty than usual.

Moreover, in a step S443, the beverage supply apparatus may obtain time information when sound data is sensed. For example, if a time in which sound data is sensed is dawn, the beverage supply apparatus may restrict water supply of the caffeine contained beverage.

Moreover, in a step S444, the beverage supply apparatus may analyze the intention based on a text that is a user's speech result. For example, if a user speaks 'a glass of water, full', the beverage supply apparatus can recognize menu type 'water' and an amount 'a glass' and 'full' from the sentence spoken by the user. Thereafter, the beverage supply apparatus can supply water so that a cup is filled with water in consideration of a weight of the cup detected through the weight detecting unit.

Moreover, in a step S445, the beverage supply apparatus may determine an optimal water supply amount according to the weight of the object. For example, if a user simply speaks 'a glass of water' without specifying an accurate amount, the beverage supply apparatus can determine an optimal water supply amount based on the measured weight of the object. For example, the beverage supply apparatus can obtain information, which indicates that water of 200 g is normally supplied in case of a cup of 300 g, through user feedback or an external server. Hence, the beverage supply apparatus can determine an optimal water supply amount based on the measured weight of the object.

Moreover, in a step S446, the beverage supply apparatus may analyze a non-linguistic expression. Here, the non-linguistic expression is a portion of sound data received from a person and may correspond to an expression other than a linguistically recognized expression. For example, the beverage supply apparatus can recognize user's yawning sound. In doing so, the beverage supply apparatus may consider a sensed time information and a non-linguistic expression together. For example, if sound data 'give me anything' is sensed from a user at 11 A.M. together with a yawning sound, the beverage supply apparatus can recognize '11 A.M.', 'yawning sound' and 'anything' and recommend 'caffeine contained beverage' in consideration of time information and non-linguistic expression.

Moreover, in a step S447, the beverage supply apparatus may analyze an intention on an amount from sound data. For example, if a user speaks 'Give me two cups of Americano', the beverage supply apparatus can analyze the measured weight of the object and the intention on the recognized amount 'two cups' and the supply water to two cups of coffee one by one to work to the weight.

Moreover, in a step S448, the beverage supply apparatus may analyze information on menu selection from the sound data. For example, if a user speaks 'a cup of Latte', the beverage supply apparatus can analyze a menu of beverage included in the recognized sound data.

And, the beverage supply apparatus may perform at least one of the steps S441 to S448 through communication with the external server or device. For example, in the step S441, the beverage supply apparatus can identify the user's age and sex through the user's speech pattern from the sensed sound data. In this case, if the beverage supply apparatus is unable to identify the user's age and sex through the information within the beverage supply apparatus, the beverage supply apparatus can obtain information using the communication with the external server or device. This shall be described in detail with reference to FIG. 6.

Moreover, although not shown in the drawing, the beverage supply apparatus may give a weight to at least one of the steps S441 to S448. Particularly, the beverage supply apparatus may obtain various kinds of information from the sensed sound data. For example, the beverage supply apparatus can obtain user's age information, user's sex information and time information from the sound data. In this case, the beverage supply apparatus may give a weight to 'time information'. Hence, the beverage supply apparatus may determine a type of a menu, an amount of the menu and a temperature of the menu by giving a weight to 'time information' rather than other information in the sound data spoken by the user. In this case, the beverage supply apparatus may select information to give a weight thereto based on the accumulated data.

In a step S450, the beverage supply apparatus may obtain user's information through at least one of the steps S441 to S448 from the sound data and determine a menu corresponding to the object. Moreover, the beverage supply apparatus may determine an amount of the menu and a temperature of the menu as well as a menu corresponding to the object by recognizing the sound data. If the type of the menu, the amount of the menu and the temperature of the menu are determined based on the collected information, the beverage supply apparatus may output information on the determined menu through the audio output unit, the display unit and/or the like.

After the information on the determined menu has been outputted, in a step S460, the beverage supply apparatus may receive feedback from the user.

If the beverage supply apparatus fails to receive user feedback on the determined menu within a preset time or receives positive feedback on the determined menu, in a step S470, the beverage supply apparatus may supply the determined menu to the detected object. For example, after the beverage supply apparatus has outputted language 'A cup of Americano is served' through the audio output unit, if positive feedback 'good' is received from a user, the beverage supply apparatus can supply 'a cup of' 'Americano' to the detected cup.

On the other hand, if the beverage supply apparatus receives negative feedback on the determined menu within the preset time, the step S430 may be performed again. For example, after the beverage supply apparatus has outputted language 'A cup of Americano is served' through the audio output unit, if positive feedback 'No, give me Latte' is received from a user, the beverage supply apparatus can perform the flow again by starting with the step S430. In this case, the beverage supply apparatus may sense the negative feedback newly received from the user as user's new sound data. This shall be described in detail with reference to FIG. 5.

Moreover, if the user's feedback is positive or negative, in a step S480, the beverage supply apparatus can accumulate data. Particularly, the beverage supply apparatus can save the sensed sound data, the user information obtained through the sound data and the information on the menu determined based on the sound data and the user information. Thereafter, the beverage supply apparatus may learn the saved information through the AI unit.

Figure 5:
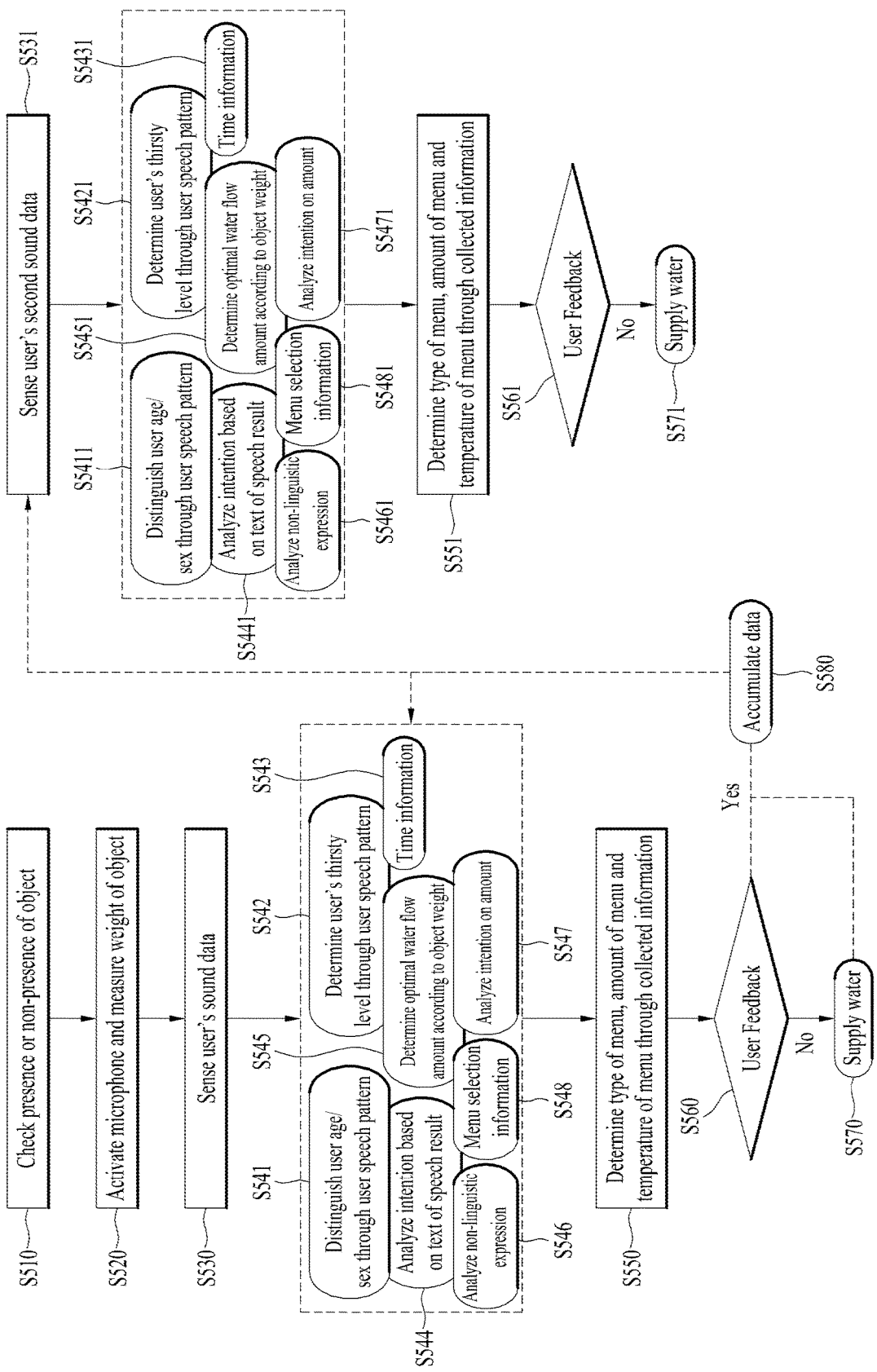
FIG. 5 is a flowchart of an operation of a beverage supply apparatus according to one embodiment of the present invention in case of presence of user's feedback.

FIG. 5 is a flowchart of an operation of a beverage supply apparatus according to one embodiment of the present invention in case of presence of user's feedback. The description redundant with FIG. 4 shall be omitted from the following description of the embodiment shown in FIG. 5.

Referring to FIG. 5, steps S510 to S560 may refer to the embodiment shown in FIG. 4. Namely, if detecting an object in the step S510, the beverage supply apparatus can activate the microphone and check the weight of the object in the step S520. In the step S530, the beverage supply apparatus may sense user's first sound data and analyze the sensed sound data in steps S541 to S548. For example, the beverage supply apparatus can sense 'A cup of coffee, please' as the user's first sound data. Thereafter, in the step S550, the beverage supply apparatus may determine a type of a menu, an amount of the menu and a temperature of the menu through the collected information. According to the aforementioned example, the beverage supply apparatus may determine the type, amount and temperature of the menu on the object as 'Americano', 'a cup' and '70°', respectively. Moreover, the beverage supply apparatus may output the information on the determined menu through the audio output unit. Namely, the beverage supply apparatus may output sound 'Here is a cup of hot coffee'.

Although the case that the user feedback is positive in the step S560 is described as an embodiment in FIG. 4, a case that user feedback is negative is taken as an example in the following description.

In the step S560, the beverage supply apparatus may receive user's negative feedback. For example, the beverage supply apparatus can receive negative feedback 'No'. Hence, in a step S580, the beverage supply apparatus can accumulate information indicating that negative feedback of the first sound data was received. The aforementioned example is described as follows. First of all, the beverage supply apparatus can save information indicating that a user corresponding to the first sound data has generated negative feedback on the determined menu of 'Americano', 'a cup' and '70°'.

Thereafter, in a step S531, second sound data may be sensed from the user. For example, the beverage supply apparatus can sense 'Give me Latte' as the second sound data from the user.

Having sensed the second sound data, the beverage supply apparatus may analyze the second sound data in steps S5411 to S5481. Particularly, the second sound data includes a menu type latte' as information only. Hence, the beverage supply apparatus may change a type of a menu only in the information analyzed through the first sound data. Namely, the beverage supply apparatus may change at least one of the informations analyzed through the first sound data into information included in the second sound data.

In a step S551, the beverage supply apparatus may determine a type of a menu, an amount of the menu and a temperature of the menu through the information collected on the basis of the second sound data. According to the aforementioned example, the beverage supply apparatus may change the type of the menu on the object into 'Latte' and determine the amount of the menu and the temperature of the menu as 'a cup' and '70°' identically. And, the beverage supply apparatus may output the information on the determined menu through the audio output unit. Namely, the beverage supply apparatus may output a sound 'Here is a cup of hot Latte'.

In a step S561, the beverage supply apparatus may receive user's feedback. If the beverage supply apparatus fails to receive the user feedback on the determined menu within a preset time or receives positive feedback on the determined menu, the beverage supply apparatus may perform a step S571. On the contrary, if receiving negative feedback on the determined menu, the beverage supply apparatus may perform the flow again by starting with the steps S530 and S531.

In the step S571, the beverage supply apparatus may supply the determined menu according to the second sound data.

Figure 6:
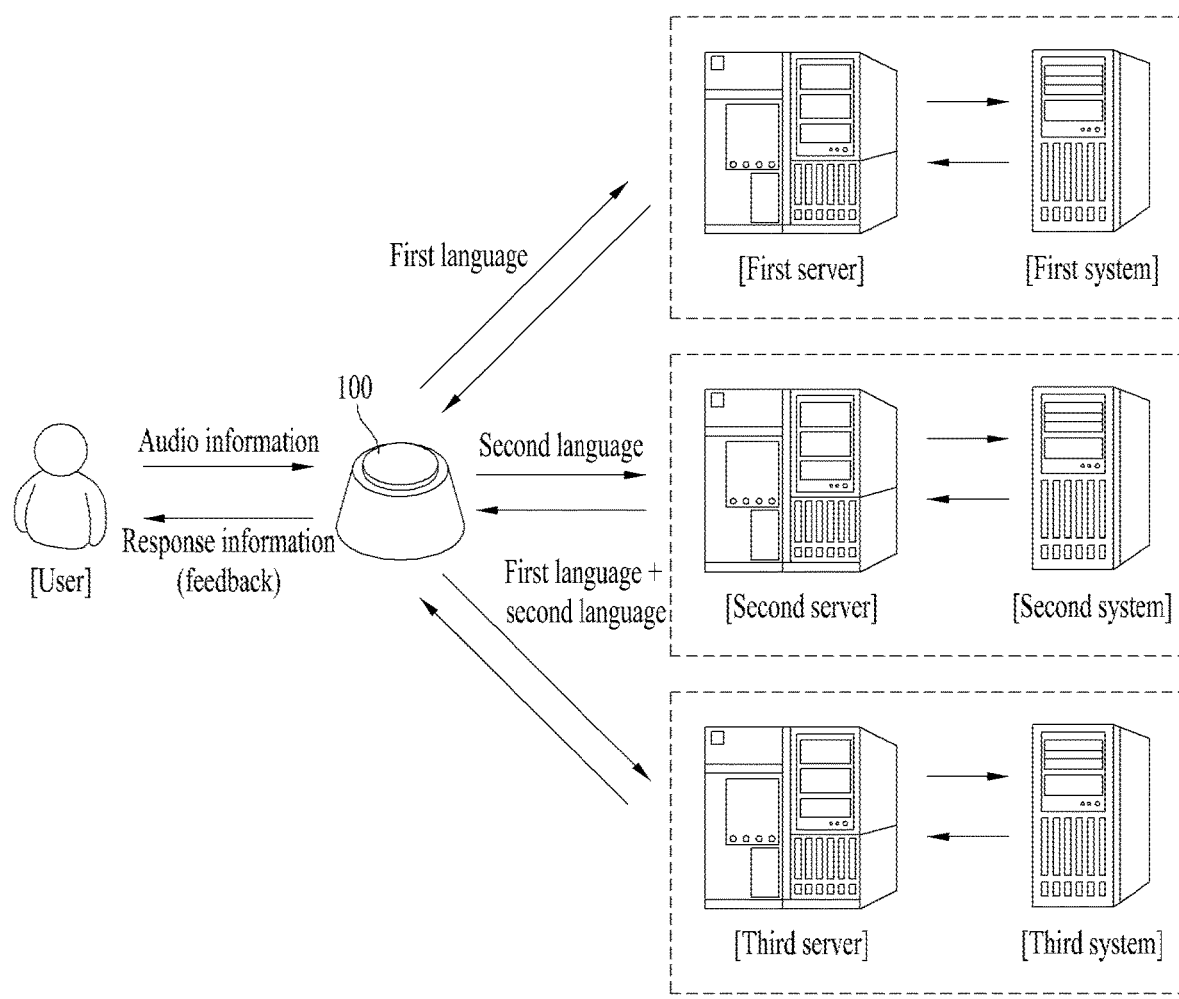
FIG. 6 is a diagram to describe an embodiment that a beverage supply apparatus according to one embodiment of the present invention communicates with a server.

FIG. 6 is a diagram to describe an embodiment that a beverage supply apparatus according to one embodiment of the present invention communicates with a server.

If sound data is received, the beverage supply apparatus 100 analyzes sound data primarily. If the beverage supply apparatus 100 is able to make a self-determination, the beverage supply apparatus 100 can send a determination result of the beverage supply apparatus 100 to a user. On the contrary, regarding the result of the primarily analyzes sound data, if the beverage supply apparatus 100 is unable to make a self-determination, the beverage supply apparatus 100 sends the sound data to a server instead of the beverage supply apparatus 100, thereby enabling the server to analyze the sound data.

Particularly, if sound data is received from a user, the beverage supply apparatus 100 may analyze the sound data primarily. In one embodiment of the present invention, if a difficulty level of the analyzed sound data is a first difficulty level, the beverage supply apparatus 100 can analyze the sound data based on information stored in the beverage supply apparatus 100. On the other hand, if the difficulty level of the analyzed sound data is a second difficulty level, the beverage supply apparatus 100 can analyze the sound data through an external server. Here, the difficulty level may be set by the beverage supply apparatus 100.

An embodiment of receiving sound data having a difficulty level on which the beverage supply apparatus 100 cannot make a self-determination is described as follows.

According to one embodiment of the present invention, the beverage supply apparatus 100 may be connectible to a plurality of servers that are connectible to a plurality of systems. The beverage supply apparatus 100 may analyze information on the received sound data, determine a language, and allocate the data to a server instead of the beverage supply apparatus 100.

First of all, if sound data is received from a user, the beverage supply apparatus 100 may determine a language of the sound data. The beverage supply apparatus 100 determines the language of the received sound data. If the language of the sound data corresponds to a first language, the beverage supply apparatus 100 may allocate the sound data to a first server. Here, the first language is assumed as a mother language. In this case, the first server may deliver a transcript corresponding to the sound data to a first system and receive an analysis result from the first system. Moreover, the server may send the analysis result to the beverage supply apparatus 100, and the beverage supply apparatus 100 may provide feedback as an audio signal to the user.

Meanwhile, if the language of the sound data corresponds to a second language, the beverage supply apparatus 100 may allocate the sound data to a second server. Here, the second language is assumed as a foreign language. In this case, the second t server may deliver a transcript corresponding to the sound data to a second system and receive an analysis result from the second system. Moreover, the server may send the analysis result to the beverage supply apparatus 100, and the beverage supply apparatus 100 may provide feedback as an audio signal to the user.

Moreover, if a language of sound data is configured with a combination of first and second languages, the beverage supply apparatus 100 may allocate the sound data to a third server. In this case, the third server may deliver a transcript corresponding to the sound data to a third system and receive an analysis result from the third system. Moreover, the server may send the analysis result to the beverage supply apparatus 100, and the beverage supply apparatus 100 may provide feedback as an audio signal to the user.

For another example, although not shown in FIG. 6, in one embodiment of the present invention, the beverage supply apparatus 100 does not determine a language of received sound data but forwards it to a server in direct, thereby providing a user with feedback received from the server and system.

Figure 7:
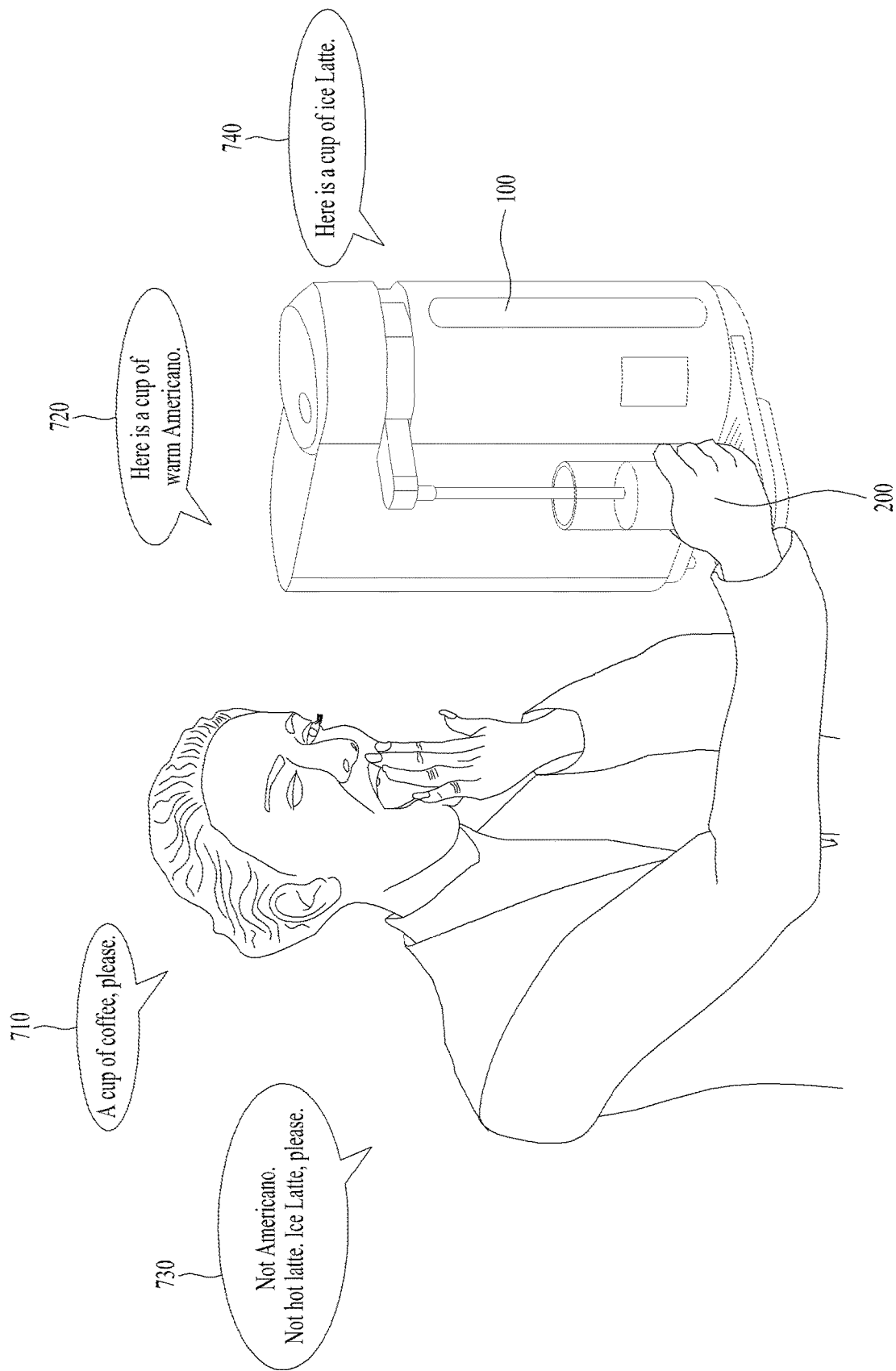
FIG. 7 is a diagram for an example that a user uses a beverage supply apparatus according to one embodiment of the present invention.

FIG. 7 is a diagram for an example that a user uses a beverage supply apparatus according to one embodiment of the present invention.

Referring to FIG. 7, the beverage supply apparatus 100 may detect an object 200. As described above, the beverage supply apparatus 100 may detect the object 200 within a preset range from the beverage supply apparatus 100 through the weight detection unit or the sensing unit provided to the beverage supply apparatus 100. The beverage supply apparatus 100 may detect a cup 200 as the object 200.

In one embodiment of the present invention, if detecting the cup 200, the beverage supply apparatus 100 may activate the microphone and measure a weight of the cup 200. The beverage supply apparatus 100 may sense a first sound data 710. Here, the first sound data 710 may correspond to an audio signal spoken by a user. In this case, the first sound data 710 may include a linguistic expression 'A cup of coffee, please' and a non-linguistic expression of a yawning sound such as 'yawning'.

The beverage supply apparatus 100 may recognize information included in the first sound data 710 in consideration of both of the linguistic and non-linguistic expressions included in the first sound data 710. The above example is described as follows. First of all, from the first sound data 710, the beverage supply apparatus 100 may obtain information indicating that a user is 'a female in thirties', information indicating that a type of menu is 'coffee', information indicating that an amount of the menu is 'a cup', information indicating that time information is '11 A.M.', information indicating that a user's condition is 'tired', etc.

In one embodiment of the present invention, the beverage supply apparatus 100 may infer unconfirmed information through data accumulated in the beverage supply apparatus 100 or data received from an external server. For example, it is unable to confirm a specific type of a menu using information included in the first sound data 710 only. Namely, since it is unable to specify a type of 'coffee', the beverage supply apparatus 100 may infer 'a type of coffee' frequently taken by 'a female in thirties' at '11 A.M.' in 'a tired condition' using the accumulated data or the data received from the external server.

Hence, the beverage supply apparatus 100 may determine a type of the menu, an amount of the menu and a temperature of the menu through the collected information. The above example is described as follows. First of all, the beverage supply apparatus 100 can infer 'Americano' as 'a type of coffee' frequently taken by 'a female in thirties' at '11 A.M.' in 'a tired condition'.

Based on the type, amount and temperature of the determined menu, the beverage supply apparatus 100 may output information on the determined menu through the audio output unit or the display unit. The above example is described as follows. First of all, the beverage supply apparatus 100 can output a linguistic expression such as 'Here is a cup of warm Americano' as a first audio signal 720. Moreover, although not shown in the drawing, it is a matter of course that the beverage supply apparatus 100 may output a visual signal 'Here is a cup of warm Americano' on the display unit.

In this case, the beverage supply apparatus 100 may receive user feedback for a preset time. Here, if the beverage supply apparatus 100 fails to receive user feedback for the preset time or receives positive feedback on the determined menu, the beverage supply apparatus 100 may supply beverage based on the type, amount and temperature of the determined menu.

An embodiment for the beverage supply apparatus 100 to receive negative feedback within a preset time is described with reference to FIG. 7 as follows.

After the first audio signal 720 has been outputted from the beverage supply apparatus 100, the user may output a second sound data 730. Here, the second sound data 730 may correspond to an audio signal spoken from the user. In this case, the second sound data 730 may include a linguistic expression 'Not Americano. Not hot latte. Ice Latte, please.'

If determining that the second sound data 730 corresponds to negative feedback, the beverage supply apparatus 100 can recognize information included in the second sound data 730. The above example is described as follows. First of all, from the second sound data 730, the beverage supply apparatus 100 may obtain information indicating that the user prefers 'Latte' to 'Americano' that is a type of menu and information indicating that the user prefers 'ice' to 'hot' that is the temperature of the menu.

In one embodiment of the present invention, the beverage supply apparatus 100 may learn the information on the user through the first sound data 710 and the second sound data 730. Particularly, the beverage supply apparatus 100 may change a state that 'a female in thirties' prefers 'hot Americano' at '11 A.M.' in 'a tired condition' through the first sound data 710 into a state that 'a female in thirties' prefers 'ice Latte' at '11 A.M.' in 'a tired condition' through the second sound data 730. Although the first sound data 710 and the second sound data 730 are described for example only in the present specification, as more data are accumulated, the beverage supply apparatus 100 can improve reasoning ability.

Therefore, the beverage supply apparatus 100 may determine the type, amount and temperature of the menu through the collected information. For example, the beverage supply apparatus 100 can determine the type, amount and temperature of the menu as 'Latte', 'a cup' and 'ice' through the second sound data 730, respectively.

Based on the type, amount and temperature of the determined menu, the beverage supply apparatus 100 may output information on the determined menu through the audio output unit or the display unit. The above example is described as follows. First of all, the beverage supply apparatus 100 can output a linguistic expression such as 'Here is a cup of ice Latte' as a second audio signal 740. Moreover, although not shown in the drawing, it is a matter of course that the beverage supply apparatus 100 may output 'Here is a cup of ice Latte' as a visual signal on the display unit.

In this case, the beverage supply apparatus 100 may receive user feedback for a preset time. Here, if the beverage supply apparatus 100 fails to receive user feedback for the preset time or receives positive feedback on the determined menu, the beverage supply apparatus 100 may supply beverage based on the type, amount and temperature of the determined menu.

Moreover, although not shown in the drawing, an audio signal outputted by the beverage supply apparatus 100 may be extracted from sound data received from a user. For example, if a user inputs sound data 'A cup of hot Americano, please', the beverage supply apparatus 100 can output an audio signal 'Here is a cup of hot Americano.' On the other hand, if a user inputs sound data 'A cup of warm Americano, please', the beverage supply apparatus 100 can output an audio signal 'Here is a cup of warm Americano.' Namely, the beverage supply apparatus 100 can improve audio signals outputted on the basis of the received sound data in various directions.

Figure 8:
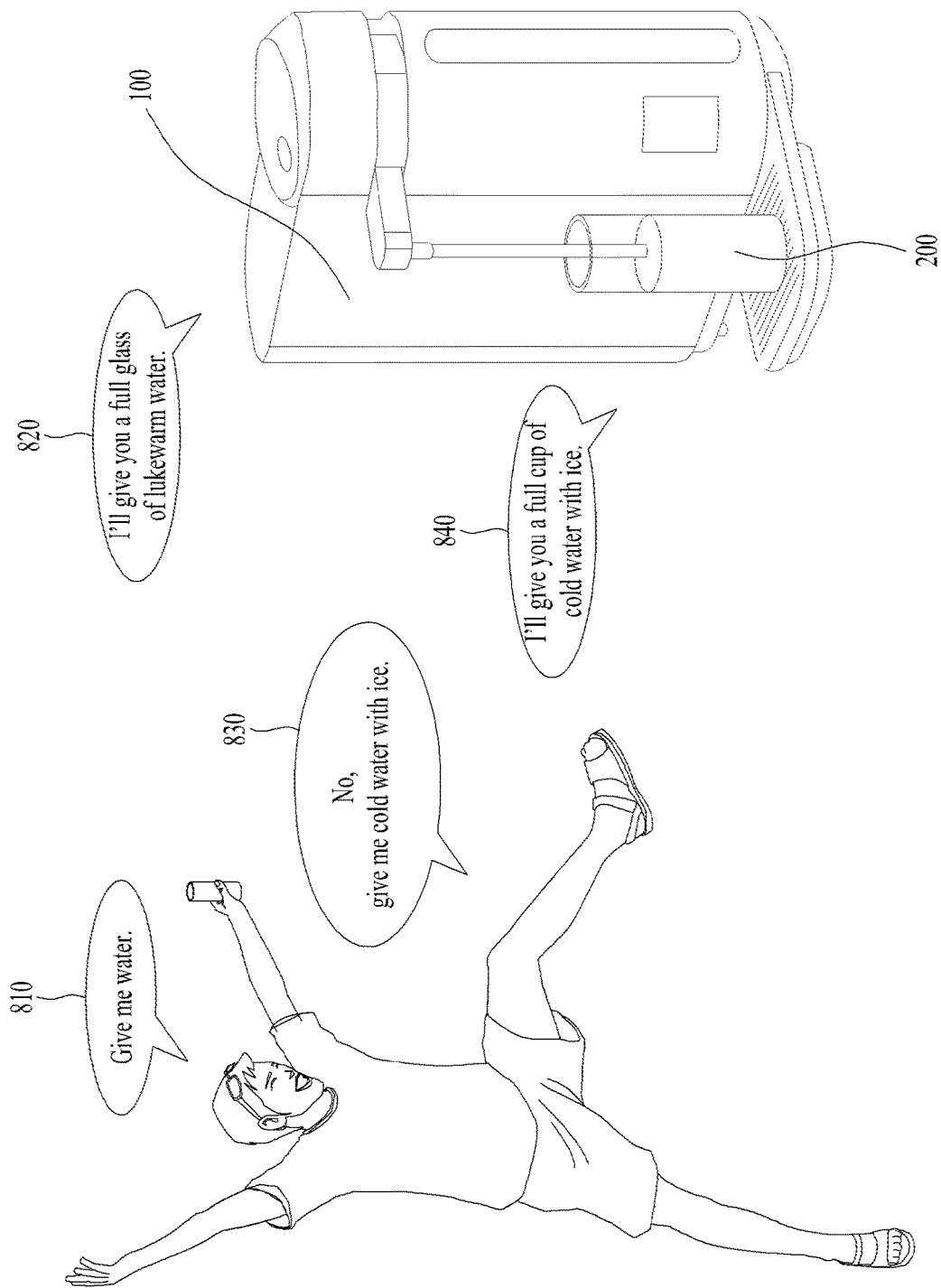
FIG. 8 is a diagram for another example that a user uses a beverage supply apparatus according to one embodiment of the present invention.

FIG. 8 is a diagram for another example that a user uses a beverage supply apparatus according to one embodiment of the present invention. The description redundant with FIG. 7 shall be omitted from the following description of the embodiment shown in FIG. 8.

Referring to FIG. 8, the beverage supply apparatus 100 may detect an object 200. In this case, the beverage supply apparatus 100 can detect a cup 200 as the object 200.

In one embodiment of the present invention, if detecting the cup 200, the beverage supply apparatus 100 may activate the microphone and measure a weight of the cup 200.

Moreover, in one embodiment of the present invention, the beverage supply apparatus 100 may sense a first sound data 810. Here, the first sound data 810 may correspond to an audio signal spoken by a user. In this case, the first sound data 710 may include a linguistic expression 'Give me water' and a non-linguistic expression of a yawning sound such as 'huff and puff'.

The beverage supply apparatus 100 may recognize information included in the first sound data 810 in consideration of both of the linguistic and non-linguistic expressions included in the first sound data 810. The above example is described as follows. First of all, from the first sound data 810, the beverage supply apparatus 100 may obtain information indicating that a user is 'a male under teenage', information indicating that a type of menu is 'water', information indicating that a user's condition is 'exhausted', etc.

In one embodiment of the present invention, the beverage supply apparatus 100 may infer unconfirmed information through data accumulated in the beverage supply apparatus 100 or data received from an external server. For example, it is unable to confirm an amount of a menu and a temperature of the menu specifically using information included in the first sound data 810 only. Namely, since it is unable to specify the amount and temperature of the menu, the beverage supply apparatus 100 should determine the amount and temperature of the menu by itself.

Hence, the beverage supply apparatus 100 may determine the amount of the menu based on the detected weight of the cup 200. Namely, the beverage supply apparatus 100 may obtain information indicating that 'a male under teenage' drinks a 'full' cup 200 of 'water' in 'an exhausted condition.' Hence, the beverage supply apparatus 100 may set the amount of the menu to 90% of the weight of the detected cup 200.

Moreover, the beverage supply apparatus 100 may infer that 'lukewarm water' is suitable for 'male under teenage' using the accumulated data or the data received from the external server. Namely, the beverage supply apparatus 100 may determine the type, amount and temperature of the menu through the collected information. For example of the above description, the beverage supply apparatus 100 may infer that 'water' taken by 'a male under teenage' in 'an exhausted condition' is 'lukewarm water'.

Based on the type, amount and temperature of the determined menu, the beverage supply apparatus 100 may output information on the determined menu through the audio output unit or the display unit. The above example is described as follows. First of all, the beverage supply apparatus 100 can output a linguistic expression such as 'I'll give you a full glass of lukewarm water' as a first audio signal 820. Moreover, although not shown in the drawing, it is a matter of course that the beverage supply apparatus 100 may output 'I'll give you a full glass of lukewarm water' as a visual signal on the display unit.

In this case, the beverage supply apparatus 100 may receive user feedback for a preset time. Here, if the beverage supply apparatus 100 fails to receive user feedback for the preset time or receives positive feedback on the determined menu, the beverage supply apparatus 100 may supply beverage based on the type, amount and temperature of the determined menu.

An embodiment for the beverage supply apparatus 100 to receive negative feedback within a preset time is described with reference to FIG. 8 as follows.

After the first audio signal 820 has been outputted from the beverage supply apparatus 100, the user may output a second sound data 830. Here, the second sound data 830 may correspond to an audio signal spoken from the user. In this case, the second sound data 830 may include a linguistic expression 'No, give me cold water with ice.'

If determining that the second sound data 830 corresponds to negative feedback, the beverage supply apparatus 100 can recognize information included in the second sound data 830. The above example is described as follows. First of all, from the second sound data 830, the beverage supply apparatus 100 may obtain information indicating that the user prefers 'ice' to 'lukewarm water' that is the temperature of the menu.

In one embodiment of the present invention, the beverage supply apparatus 100 may learn the information on the user through the first sound data 810 and the second sound data 830. Particularly, the beverage supply apparatus 100 may change a state that 'a male under teenage' prefers 'lukewarm water' in 'an exhausted condition' through the first sound data 810 into a state that 'a male under teenage' prefers 'water with ice' in 'an exhausted condition' through the second sound data 830. Although the first sound data 810 and the second sound data 830 are described for example only in the present specification, as more data are accumulated, the beverage supply apparatus 100 can improve reasoning ability.

Therefore, the beverage supply apparatus 100 may determine the type, amount and temperature of the menu through the collected information. For example, the beverage supply apparatus 100 can determine the type, amount and temperature of the menu as 'water', '90% of the cup 200' and 'ice' through the second sound data 830, respectively.

Based on the type, amount and temperature of the determined menu, the beverage supply apparatus 100 may output information on the determined menu through the audio output unit or the display unit. The above example is described as follows. First of all, the beverage supply apparatus 100 can output a linguistic expression such as 'I'll give you a full cup of cold water with ice' as a second audio signal 840. Moreover, although not shown in the drawing, it is a matter of course that the beverage supply apparatus 100 may output 'I'll give you a full cup of cold water with ice' as a visual signal on the display unit.

In this case, the beverage supply apparatus 100 may receive user feedback for a preset time. Here, if the beverage supply apparatus 100 fails to receive user feedback for the preset time or receives positive feedback on the determined menu, the beverage supply apparatus 100 may supply beverage based on the type, amount and temperature of the determined menu.

Moreover, although not shown in the drawing, an audio signal outputted by the beverage supply apparatus 100 may be outputted differently based on the obtained user information. For example, if a user of the sound data recognized by the beverage supply apparatus 100 is 'a male under teenage', the beverage supply apparatus 100 can output a result of the sound data as a voice of 'a female in forties'. Namely, the beverage supply apparatus 100 may output an audio signal with a user-preferred voice and speech pattern based on an age and sex of the recognized user.

Figure 9:
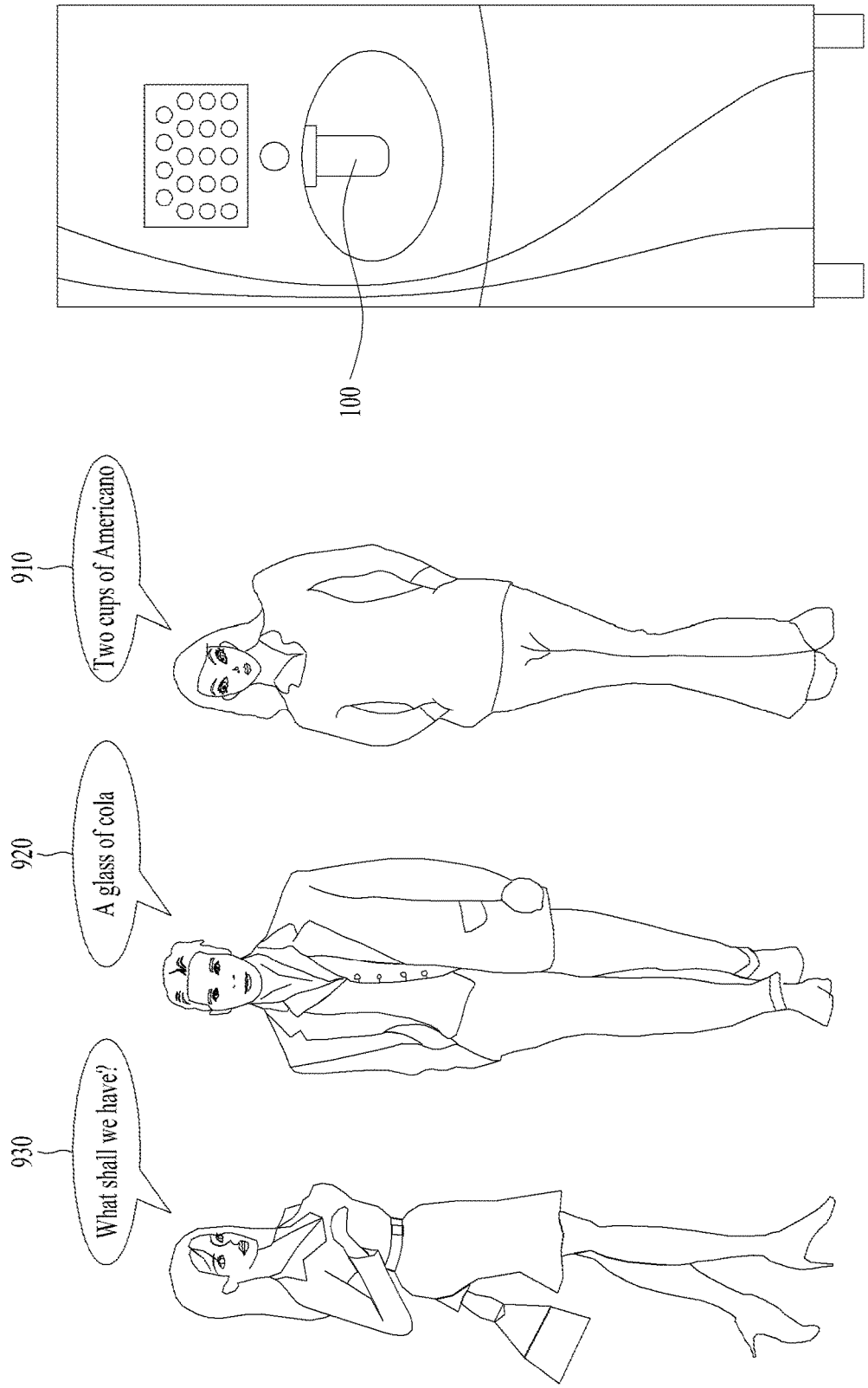
FIG. 9 is a diagram for further example that a user uses a beverage supply apparatus according to one embodiment of the present invention.

FIG. 9 is a diagram for further example that a user uses a beverage supply apparatus according to one embodiment of the present invention. The description redundant with FIG. 7 and FIG. 8 shall be omitted from the following description of the embodiment shown in FIG. 4.

Referring to FIG. 9, the beverage supply apparatus 100 may be configured as a part of a product. For example, the beverage supply apparatus 100 of the present invention may be configured as a part of a refrigerator or an espresso machine. In the embodiment of FIG. 9, the beverage supply apparatus 100 senses sound data from various persons for example.

In one embodiment of the present invention, the beverage supply apparatus 100 may sense a first sound data 910 from a first user. Here, the first sound data 910 may correspond to an audio signal spoken from the first user. In this case, the beverage supply apparatus 100 may convert the first sound data 910 into a text 'Two cups of Americano.'

The beverage supply apparatus 100 may extract information included in the first sound data 910. For example of the above description, from the first sound data 910, the beverage supply apparatus 100 may obtain information indicating that the first user is 'a female in twenties', information indicating that a type of a menu is 'Americano', and information indicating that an amount of the menu is 'two cups'.

In this case, the beverage supply apparatus 100 may infer information that is not obtained from the first sound data 910. For example, it is unable to specifically confirm a temperature of the menu with the information included in the first sound data 910 only. Hence, if a user desires 'Americano' only in general, the beverage supply apparatus 100 may infer that it means 'hot Americano'.

By adding the information obtained from the first sound data 910 and the inferred information together, the beverage supply apparatus 100 may generate feedback. For example, the beverage supply apparatus 100 can output an audio signal 'I'll give you two gups of hot Americano'. Thereafter, if failing to receiver feedback within a preset time or receiving positive feedback, the beverage supply apparatus 100 may supply the determined menu.

Moreover, in another embodiment of the present invention, the beverage supply apparatus 100 may sense a second sound data 920 from a second user. Here, the second sound data 920 may correspond to an audio signal spoken from the second user. In this case, the beverage supply apparatus 100 may convert the second sound data 920 into a text 'a cup of cola'.

The beverage supply apparatus 100 may extract information included in the second sound data 920. For example of the above description, from the second sound data 920, the beverage supply apparatus 100 may obtain information indicating that the second user is 'a male in thirties', information indicating that a type of a menu is 'cola', and information indicating that an amount of the menu is 'a cup'.

In this case, the beverage supply apparatus 100 may infer information that is not obtained from the second sound data 920. For example, it is unable to specifically confirm a temperature of the menu with the information included in the second sound data 920 only. Hence, if a user desires 'cola' in general, the beverage supply apparatus 100 may infer that it means 'cola with ice'.

By adding the information obtained from the second sound data 920 and the inferred information together, the beverage supply apparatus 100 may generate feedback. For example, the beverage supply apparatus 100 can output an audio signal 'I'll give you a cup of cold cola with ice.' Thereafter, if failing to receiver feedback within a preset time or receiving positive feedback, the beverage supply apparatus 100 may supply the determined menu.

Moreover, in another embodiment of the present invention, the beverage supply apparatus 100 may sense a third sound data 930 from a third user. Here, the third sound data 930 may correspond to an audio signal spoken from the third user. In this case, the beverage supply apparatus 100 may convert the third sound data 930 into a text 'What shall we have?'

The beverage supply apparatus 100 may extract information included in the third sound data 930. For example of the above description, from the third sound data 920, the beverage supply apparatus 100 may obtain information indicating that the third user is 'a female in twenties' and recognize that a type, amount and temperature of a menu are not confirmed yet.

In one embodiment of the present invention, since the beverage supply apparatus 100 is unable to confirm the type, amount and temperature of the menu from the third sound data 930, the beverage supply apparatus 100 may confirm the type, amount and temperature of the menu based on data stored inside or outside the beverage supply apparatus 100. For example, the beverage supply apparatus 100 can recognize the first user having the age and sex similar to those of the third user from the first sound data 910 created before sensing the third sound data 930. Namely, the beverage supply apparatus 100 may recommend a type, amount and temperature of the menu to the first user by referring to the information of the first user having the age and sex similar to those of the third user.

In one embodiment of the present invention, the beverage supply apparatus 100 may output an audio signal 'How about a cup of hot Americano?' to the third user. Thereafter, if the beverage supply apparatus 100 fails to receive feedback within a preset time or receives positive feedback, the beverage supply apparatus 100 may supply the determined menu.

Namely, in case of the embodiment of the third user, the beverage supply apparatus 100 is unable to confirm the type, amount and temperature of the menu with the third sound data 930 only. In this case, the beverage supply apparatus 100 may recommend a menu to the third user based on statistical data of the third user's age and sex through the internal memory or the external server based on the third user's age and sex obtained from the third sound data 930. On the other hand, if obtaining the last data of the age and sex similar to those of the third user before sensing the third sound data 930, the beverage supply apparatus 100 may utilize this information most preferentially.

Furthermore, although the respective drawings are described separately for clarity, it is possible to design implementation of a new embodiment by merging the embodiments illustrated in the respective drawings.

Moreover, an apparatus for supplying beverage and controlling method thereof may be configured in a manner of selectively combining all or some of embodiments to enable various modifications instead of restrictively applying configurations and methods of the above-described embodiments.

The above-described present invention can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal. Therefore, this description is intended to be illustrative, and not to limit the scope of the claims. Thus, it is intended that the present invention covers the modifications and variations of this invention provided they come within the scope of the appended claims and their equivalents.

INDUSTRIAL APPLICABILITY

The present invention has industrial applicability in a beverage supply apparatus and is applicable iteratively.

What is claimed is:

1. An apparatus for supplying beverage, the apparatus comprising:
    a sensing unit;
    a microphone;
    an artificial intelligence unit, and
    a controller capable of:
    activating the microphone when an object detected,
    recognizing a first sound data of a user when the first sound data is sensed through the activated microphone,
    obtaining information of the user based on the first sound data,
    storing the obtained information of the user,
    determining a menu corresponding to the object based on the user's information and the first sound data, and
    controlling a water supply unit to supply the determined menu to the object,
    wherein the artificial intelligence unit is further configured to:
        store the user's information and information on the menu by learning the first sound data,
        when both a linguistic expression and a non-linguistic expression are included in the first sound data, determine the user's information by considering both of the linguistic expression and the non-linguistic expression, and
        store the user's information and the information on the menu,
    wherein the non-linguistic expression includes a yawning sound.

2. The apparatus of claim 1, wherein the controller is further capable of:
    converting the first sound data into a text, and
    determining the menu corresponding to the object based on the text.

3. The apparatus of claim 1, further comprising an audio output unit, wherein when the menu corresponding to the object is determined, the controller is further capable of outputting the information on the menu as an audio signal through the audio output unit.

4. The apparatus of claim 1, further comprising a display unit, wherein when the menu corresponding to the object is determined, the controller is further capable of outputting the information on the menu as a visual signal through the display unit.

5. The apparatus of claim 1, wherein when a second sound data of the user is sensed through the activated microphone, the controller is further capable of changing the menu corresponding to the object based on the second sound data.

6. The apparatus of claim 5, wherein when the second sound data is sensed, the artificial intelligence unit is capable of storing the user's information and information on the menu by learning the first sound data and the second sound data.

7. The apparatus of claim 1, wherein the controller is further capable of determining at least one of a type, amount or temperature of the supplied menu based on the user's information and the first sound data.

8. The apparatus of claim 1, further comprising a memory, wherein one of the controller and the artificial intelligence unit is capable of storing information on at least one of the first sound data, the users information and the menu to the memory.

9. The apparatus of claim 1, further comprising a weight detecting unit, wherein the controller is further capable of measuring a weight of the object through the weight detecting unit and determining an amount of the menu based on the measured weight of the object.

10. The apparatus of claim 1, further comprising a camera, wherein controller is further capable of obtaining the user's information through the camera.

11. The apparatus of claim 1, further comprising a wireless communication unit performing communication with an external server or an external device, wherein when sensing the first sound data, the controller is further capable of obtaining information of the user corresponding to the first sound data through the external server or the external device.

12. The apparatus of claim 11, wherein the controller is further capable of analyzing a difficulty level of the first sound data, wherein when the analyzed difficulty level is a first difficulty level, the controller is further capable of determining the menu based on information stored in the apparatus for supplying the beverage, and wherein when the analyzed difficulty level is a second difficulty level, the controller is further capable of determining the menu through the external server or the external device.

13. The apparatus of claim 1, wherein the controller is further capable of determining the menu corresponding to the object by considering time information.

14. The apparatus of claim 1, wherein the user's information includes age information and sex information.

15. A method of controlling a beverage supply apparatus, the method comprising:
  detecting an object;
  activating a microphone;
  sensing a first sound data of a user;
  recognizing the first sound data;
  obtaining information of the user based on the first sound data;
  storing the obtained information of the user;
  determining a menu corresponding to the object based on the user's information and t first sound data;
  storing the user s information and information on the menu by learning the first sound data; controlling a water supply unit to supply the determined menu to the object;
  when both a linguistic expression non-linguistic expression are included in the first sound data, determining the user's information by considering both of the linguistic expression and the non-linguistic expression; and
  storing the user's information and the information on the menu,
  wherein the non-linguistic expression includes a yawning sound.

* * * * *